Nov. 2, 1954
S. S. MADER
2,693,059
GRINDING MACHINE
Filed July 16, 1952
2 Sheets-Sheet 1
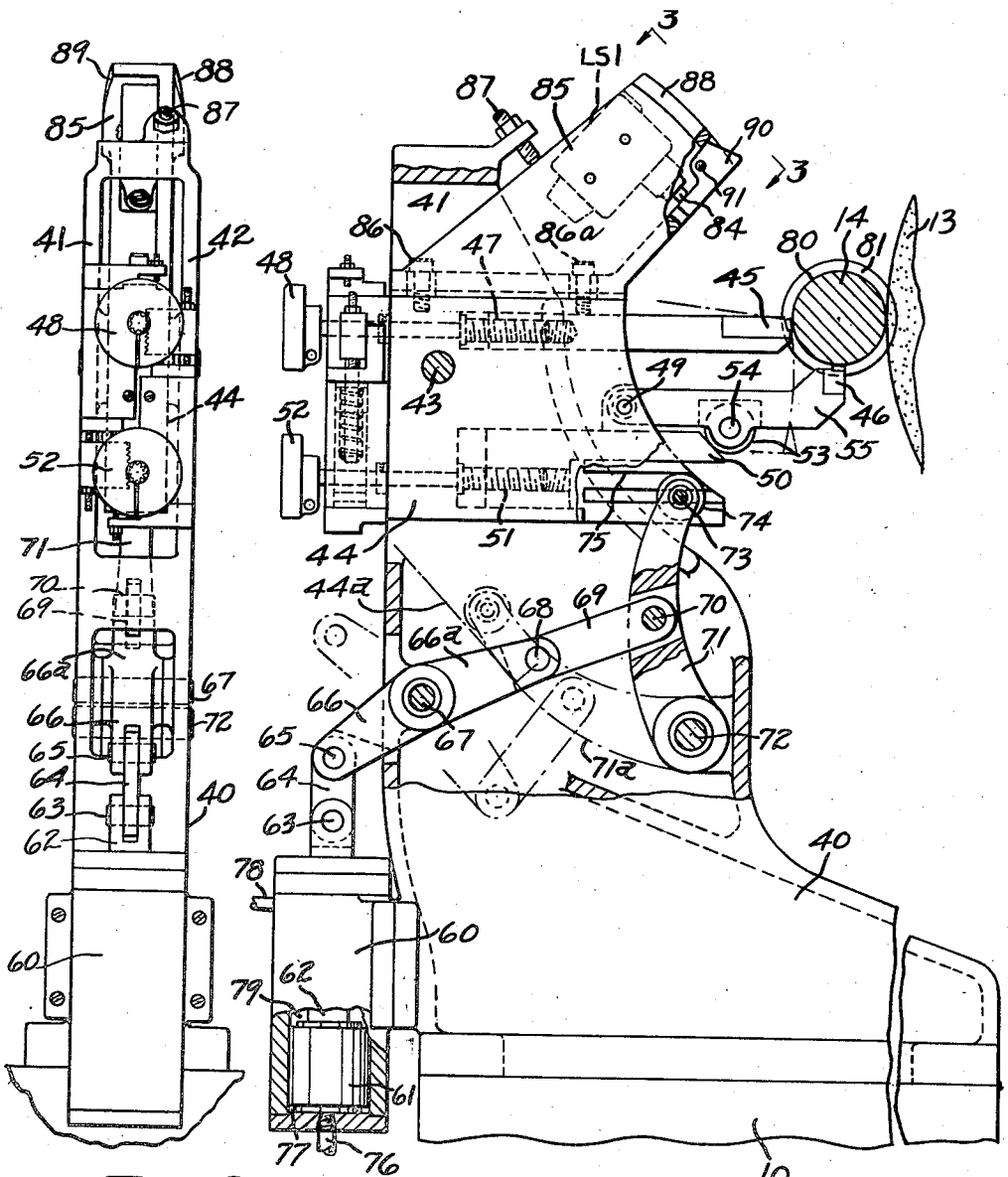
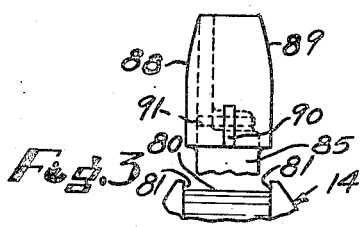
INVENTOR.
STEWART S. MADER
BY
Harold W. Eaton Nov. 2, 1954

S. S. MADER 2,693,059

GRINDING MACHINE

Filed July 16, 1952

INVENTOR.
STEWART S. MADER
BY
Harold W. Eaton

United States Patent Office 2,693,059
Patented Nov. 2, 1954

2,693,059

GRINDING MACHINE

Stewart S. Mader, Worcester, Mass., assignor to Norton Company, Worcester, Mass., a corporation of Massachusetts Application July 16, 1952, Serial No. 299,175

8 Claims. (Cl. 51—105)

This invention relates to grinding machines, and more particularly to a work piece locating mechanism.

One object of the invention is to provide a simple and thoroughly practical work locating mechanism to position a rotatable work piece in an axial direction relative to the work support. Another object is to provide a work locating mechanism for positioning a work piece having spaced shouldered portions thereon in an axial direction to position the portion of the work piece to be ground into alignment with the grinding wheel to facilitate equalizing the side grinding of the wheel on spaced shouldered portions on the work piece. Another object of the invention is to provide a movable work locating device for moving a work piece axially within the work chucks to align the portion of the work piece to be ground with the transversely movable grinding wheel. Another object of the invention is to provide a work locating apparatus including a movable member which is arranged to swing into engagement with a portion of work piece so as to cause an axial movement thereof to align the portion of the work piece relative to the grinding wheel. A further object of the invention is to provide a pivotally mounted work locating mechanism on a grinding wheel steady rest to facilitate moving the work piece axially when the steady rest is moved to an operative position to facilitate an axial location of the work relative to the supporting and driving chucks so as to align a predetermined portion of the work piece with the grinding wheel. Other objects will be in part obvious or in part pointed out hereinafter.

The invention accordingly consists in the features of construction, and alignment of parts, as will be exemplified in the structure to be hereinafter described, and the scope of the application will be indicated in the following claims:

In the accompanying drawings in which is shown one of various possible embodiments of the mechanical features of this invention.

Fig. 1 is a vertical sectional view through the steady rest and work positioning mechanism;

Fig. 2 is a front elevation of the steady rest;

Fig. 3 is a fragmentary detailed view, taken approximately on the line 3—3 of Figure 1 showing the work positioning member;

Figure 4:
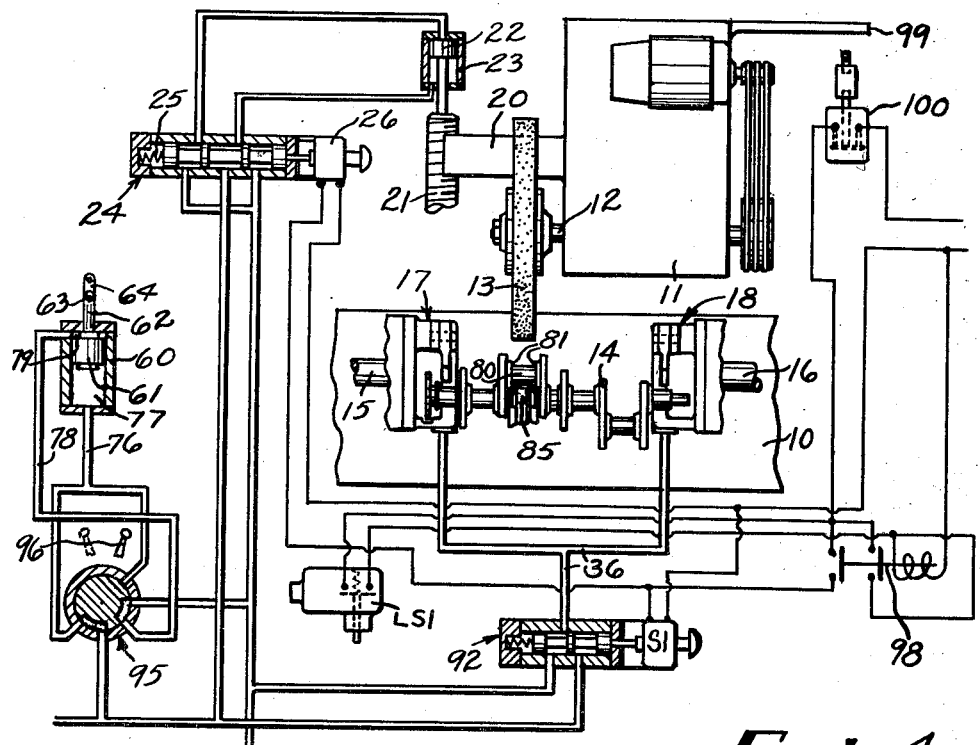
Fig. 4 is an electric and hydraulic diagram of the actuating mechanisms of the machine.

Portions of a crankshaft grinding machine have been illustrated in the drawings which may for example be substantially the same as that shown in the prior U. S. Patent No. 2,151,666 to H. A. Silven, dated March 21, 1939, to which reference may be had for detail of disclosure not contained herein.

As illustrated in the drawings, a machine base 10 serves as a support for a transversely movable wheel slide 11 having a rotatable wheel spindle 12 substantially journalled therein. The wheel spindle 12 serves as a support for a grinding wheel 13 which is arranged to grind either the crankpins or main bearings of a crankshaft 14. The crankshaft 14 is preferably supported by a work table (not shown) which in turn supports a pair of spaced work heads (not shown) the work heads are provided with rotatable axially aligned work spindles 15 and 16 respectfully. Pot chucks 17 and 18 are mounted on the inner ends of the work spindles 15 and 16 respectfully so as to support and rotate the opposite ends of a crankshaft to be ground.

Figure 5:
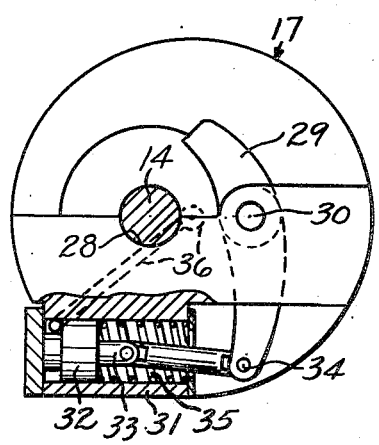
Fig. 5 is an elevation of one of the work supporting and rotating pot chucks.

The grinding wheel slide 11 is arranged to be fed transversely toward and from the crankpin 14 by means of a suitable feeding mechanism comprising a half nut 20 fixedly mounted on the wheel slide 11 which meshes with a rotatable feed screw 21. The feed screw 21 is rotatably journalled within the base 10 of the machine. A hydraulic piston 22 and cylinder 23 are arranged in axially alignment with the feed screw 21 to facilitate a rapid approaching and infeeding movement of the wheel slide 11. A suitable control valve 24 is provided for controlling the admission to and exhaust of fluid from the cylinder 23 to cause either a forward or rearward movement of slide 11. The valve 24 is normally held in one end position by means of a compression spring 25 and a solenoid 26 is provided which when energized serves to shift the valve 24 into its other exteremе position so as to reverse the flow of fluid to the cylinder 23. The pot chucks 17 and 18 are old and well known in the crankshaft grinding art and may comprise a partial cylindrical bearing surface 28 for supporting the end portions of the crankshaft 14 a pivotally mounted clamp jaw 29 is supported on a pivot stud 30 carried by the chuck 17. The chuck 17 is provided with a cylinder 31 having a slidably mounted piston 32. The piston 32 is connected to one end of a piston rod 33. The other end of the piston rod 33 is connected by a stud 34 carried by the clamping jaw 29. A compression spring 35 serves normally to hold the piston 32 in a left hand end position (Fig. 5). When fluid under pressure is passed through a pipe 36, into the cylinder chamber formed in the lower end of cylinder 31, the piston 32 together with piston rod 33 will be moved in an upward direction to locate the clamping jaw 29 in a counter-clockwise direction to calmp the crankshaft 14 in position on the chuck 17. The pot chuck 18 is identical in construction with the pot chuck 17 and consequently has not been illustrated and described in detail.

The portion of the work piece being ground, namely, a crankpin or main bearing of the crankshaft 14 is preferably steadied during a grinding operation by a steady rest to be hereinafter described. The steady rest preferably comprises a steady rest base 40 having a pair of upwardly extending spaced side plates 41 and 42 which support a pivot stud 43. The pivot stud 43 supports a pivotally mounted steady rest frame 44 which is arranged so that it may be swung to and from an operative position. The steady rest frame 44 is provided with a pair of work steadying positions 45 and 46 for engaging and steadying the portion of the work piece being ground. The steady rest as illustrated may be substantially identical with that shown in the prior U. S. Patent 2,419,170 to H. A. Silven dated April 15, 1947, to which reference may be had for details of disclosure not contained herein.

The steady rest shoe 45 is arranged to slide in a horizontal direction and may be adjusted by a manually operable screw 47 which is actuated by a knob 48 mounted on the left hand end thereof (Fig. 1).

The work steadying shoe 46 is mounted on a pivotally mounted arm 55 supported by a stud 49 carried by the steady rest frame 44. A manually adjustable horizontally movable cam 50 is provided for adjusting the shoe 46. The cam 50 is arranged to be adjustable in a horizontal direction by means of a manually operable screw 51 which may be actuated by a manually operable knob 52 mounted on the left hand end thereof (Fig. 1). The cam 50 is arranged to engage an actuating roller 53 carried by a stud 54 mounted on the arm 55. It will be readily apparent from the foregoing disclosure that by manipulation of the knobs 48 and 52 the work steadying shoes 45 and 46 may be readily adjusted so as to support the crankpin on the crankshaft 14 being ground.

The steady rest shoes 45 and 46 may be actuated automatically in a manner substantially the same as that shown in U. S. Patent No. 2,419,170 in which a hydraulic piston and cylinder serves to hold each shoe normally in an inoperative position. When the fluid under pressure is released from the cylinder, a pair of compression springs serve automatically to rotate the screws 47 and 51 respectively to advance the shoes 45 and 46 respectively into operative engagement with the work piece 14 and to maintain them in operative engagement therewith as the work is ground to size. This mechanism has not been described in detail and reference may be had to the above mentioned patent for further details of disclosures.

A hydraulically operated mechanism is provided for swinging the steady rest frame 44 from the normally inoperative position 44a in a counter-clockwise direction into the full line position as indicated in Fig. 1. This mechanism may comprise a hydraulic cylinder 60 which is fixedly mounted on the steady rest base 40. The cylinder 60 contains a slidably mounted piston 61 which is connected to the lower end of a piston rod 62. The upper end of the piston rod 62 is connected by a stud 63 with a link 64. The upper end of the link 64 is connected by a stud 65 with rock arm 66 which is pivotally supported by a shaft stud 67 carried by the steady rest base 40. The rock arm 66 is provided with an integral arm 66a which is connected by a stud 68 with one end of a link 69. The other end of the link 69 is connected by a stud 70 with a rock arm 71 the lower end of which is pivotally connected by a stud 72 carried by the steady rest base 40. The upper end of the arm 71 is provided with a stud 73 which supports a roller 74. The roller 74 is arranged to engage a slide surface 75 on the steady rest frame 44. The levers 66a and 69 serve as toggle levers to rock the frame 44 in an operative position. When it is desired to retract the steady rest frame 44 to an inoperative position, fluid under pressure is passed through a pipe 76 into a cylinder chamber 77 form in the lower end of the cylinder 60 to cause an upward movement of the piston 61. This movement through the lever mechanism above described causes the rocker arm 71 to rock in a counter-clockwise direction into position 71a. As the rock arm 71 moves toward position 71a, the steady rest frame 44 is rocked by gravity in a clockwise direction into position 44a. Similarly when it is desired to raise the steady rest frame into an operative position before a grinding operation, fluid under pressure is passed through a pipe 78 into a cylinder chamber 79 formed in the upper end of the cylinder 60 to cause a downward movement of the piston 61 into the position illustrated in Fig. 1 thereby rocking the lever mechanism above described into the full line position illustrated in Fig. 1.

In grinding a crankpin on a crankshaft 14, it is desirable to grind not only the cylindrical portion 80 of the pin but also the adjacent shouldered faces 81 and the fillets between the shouldered faces and the cylindrical portion 80.

Crankshafts which have been rough turned before the grinding operation vary within certain limits that is, the distance between shoulder faces 81 vary and also the distance between successive crankpins on the crankshaft vary so that it is necessary to cause an axial adjustment either of the wheel or the work piece in order to equalize the side grinding of the wheel on the shouldered faces 81. This is normally referred to in crankshaft grinding as splitting-the-sparks. In order to split the spark automatically and to attain the main object of this invention, it is desirable to provide a suitable mechanism for imparting an axial shifting movement of the crankshaft 14 relative to the pot chucks 17 and 18 to center the shoulders 81 with respect to side facing of the grinding wheel. This is preferably accomplished during the swinging movement of the steady rest frame 44 from the inoperative position 44a into the full line position 44 (Fig. 1). The steady rest frame 44 is provided with a upwardly extending arm 85 which is connected to the steady rest frame by screws 86 and 86a. The upper end of the arm 85 is provided with spaced cam faces 88 and 89. The upper end of the cam faces are spaced by distance somewhat shorter than the distance between the shoulders 81 and the lower portions of the cams 88 and 89 are spaced to clear the minimum tolerance between the shouldered faces 81 on the pin 80. If the crankpin 80 is slightly out of line with respect to the grinding wheel 13, the upward movement of the steady rest frame 44 to an operative position will move either the cam 88 or the cam 89 into engagement with one of the shouldered faces 81 of the crankpin 80 after which continued movement of the arm 85 will shift the crankshaft 14 to be ground axially within the support pot chucks 17 and 18 so as to center the shoulder faces 81 with respect to the grinding wheel 13. The movement of the arm 85 into an upper motion position is limited by a stop screw 87.

After the crankpin 80 has been centered with respect to the grinding wheel, it is desirable to clamp the crankshaft 14 in position in the pot chucks 17 and 18 and to initiate a forward feeding movement of the grinding wheel 13. This is preferably accomplished by an electrically operated mechanism comprising a limit switch LS1 carried by the arm 85. The limit switch LS1 is provided with an actuating plunger 84 which is actuated by a pivotally mounted lever 90 carried by a stud 91 on the arm 85. As the arm 85 swings upwardly in a counter-clockwise direction, the cam faces 88 and 89 serve to center the crankpin with respect to the grinding wheel at which time the crankpin 80 is engaged by the rock arm 90. During continued upward movement of the arm 85, the arm 90 moves into engagement with the work piece and swings in a clockwise direction to close the limit switch LS1 so as to energize a solenoid S1 to shift a control valve 92 so as to admit fluid under pressure through the pipe 36 thereby swinging the clamping jaws 29 so as to clamp the crankshaft 14 in an operative position for a grinding operation. At the same time the closing of the limit switch LS1 serves to energize the solenoid 26 to shift the said control valve 24 so as to initiate a forward feeding movement of the wheel slide 11 and the grinding wheel 13.

A suitable control mechanism is provided for controlling the admission to and exhaust of fluid from the cylinder 60 to facilitate movement of the steady rest frame 44 to and from an operative position. As illustrated diagrammatically this control may comprise a valve 95 which is actuated by a manually operable lever 96 so that the fluid under pressure may be admitted to or exhausted from the cylinder 60 as desired.

The operation of the improved work rocking mechanism will be readily apparent from the foregoing disclosure. Assuming all of the adjustments have been previously made, a crankshaft 14 is placed in position in the pot chucks 17 and 18. The control lever 96 is then shifted to admit fluid under pressure through the pipe 78 into the cylinder chamber 79 to cause the steady rest frame 44 to move from the broken line position 44a (Fig. 1) into the full line position 44. During this movement, the arm 85 swings in a counterclockwise direction so that one of the cams 88 or 89 will move into engagement with one of the shoulders 81 of the crankpin 80 and cause an axial movement of the crankshaft 14 relative to the pot chucks 17 and 18 to center the shoulders 81 relative to the grinding wheel 13 so that when the grinding wheel is fed forward to grind the pin 80 the side grinding on the shoulders 81 will be equalized. After the crankpin 80 has been centered, continued movement of the arm 85 in a counterclockwise direction moves the rock arm 90 into engagement with the crankpin 80 and closes the limit switch LS1 to energize solenoid S1 thereby shifting the valve 92 so that fluid under pressure is passed through the pipe 36 to actuate the clamping jaws 29 to lock the crankshaft 14 in the pot chucks 17 and 18 for a grinding operation. At the same time, the closing of the limit switch LS1 energizes the solenoid 26 to shifting the feed control valve 24 so as to cause a forward feeding movement of the grinding wheel 13 and the wheel slide 11.

Closing of the limit switch LS1 energizes a relay switch 98 which sets up holding circuit to maintain the solenoids S1 and 26 energized after the rock arm 90 moves upwardly out of engagement with the crankpin 80. The solenoids S1 and 26 remain energized until the wheel slide 11 reaches an extreme forward position at which time a lug 99 on the wheel slide 11 opens a normally closed limit switch 100 thereby breaking the circuit to deenergize the solenoids S1 and 26. Deenergizing solenoid 26 shifts the valve 24 to cause a rearward movement of the wheel slide 11. Deenergizing the solenoid S1 shifts the valve 92 to release the clamping jaws 29.

It will thus be seen that there has been provided by this invention apparatus in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accom-

I claim:

1. In a grinding machine having a base, a transversely movable rotatable grinding wheel thereon, means including a piston and cylinder to feed said wheel transversely, a work support on said base including a pair of spaced axially aligned rotatable pot chucks for supporting and rotating a work piece to be ground, a pivotally mounted clamping jaw on each of said chucks, a piston and cylinder on each of said chucks for actuating said jaws, a movably mounted arm on said base, a pair of spaced work engaging surfaces on said arm which are aligned with the side faces of the grinding wheel, and means including a piston and cylinder to move said arm to and from an operative position, said surfaces serving during movement of said arm to an operative position to engage spaced shouldered faces on the work piece to position it axially relative to said chucks into axial alignment with the grinding wheel.

2. In a grinding machine, as claimed in claim 1, in combination with the parts and features therein specified of a solenoid actuated control valve to admit fluid under pressure to the pot chuck cylinders, and means including a limit switch on said arm which is actuated by movement of the arm to an operative position to energize said solenoid valve to actuate the clamping jaws after the work piece has been positioned axially relative to the grinding wheel.

3. In a grinding machine, as claimed in claim 1, in combination with the parts and features therein specified of a solenoid actuated control valve to admit fluid under pressure to the wheel feed cylinder, and means including a limit switch on said arm which is actuated by movement of said arm to an operative position to energize said solenoid valve so as to cause a feeding movement of the grinding wheel after the work piece has been positioned axially relative to the grinding wheel.

4. In a grinding machine, as claimed in claim 1, in combination with the parts and features therein specified of a solenoid actuated control valve simultaneously to admit fluid under pressure to the pot chuck cylinders and to the wheel feed cylinder, and means including a limit switch actuated by movement of the said arm to an operative position to energize said solenoid valve so as to actuate said clamping jaws and to cause a feeding movement of the grinding wheel only after the work piece to be ground has been positioned axially relative to the grinding wheel.

5. In a grinding machine having a base, a transversely movable rotatable grinding wheel thereon, a means including a piston and cylinder to feed said wheel transversely, a work support on said base including a pair of spaced axially aligned rotatable pot chucks for supporting and rotating a work piece to be ground, a pivotally mounted clamping jaw on each of said chucks, a piston and cylinder on each of said chucks for actuating said jaws, a work steady rest on said base having a steady rest frame which is movable to and from an operative position, means including a piston and cylinder to move said steady rest frame to and from an operative position, and a pair of spaced work engaging surfaces on said frame which are aligned with the side face of the grinding wheel, said surfaces being arranged to engage spaced shouldered faces on a work piece as the frame is moved into an operative position to move the work piece axially relative to the pot chucks so as to align the portion of the work piece to be ground relative to the grinding wheel.

6. In a grinding machine, as claimed in claim 5, in combination with the parts and features therein specified on a solenoid actuated control valve to admit fluid under pressure to the pot chuck cylinders, and a limit switch on said frame which is actuated by movement of the frame to an operative position to energize the solenoid valve to actuate the clamping jaws after the work piece has been positioned relative to the grinding wheel.

7. In a grinding machine, as claimed in claim 5, in combination with the parts and features therein specified of a solenoid actuated control valve to admit fluid under pressure to the wheel feed cylinder, and a limit switch on said steady rest frame which is actuated by movement of the frame to an operative position to energize said solenoid valve to cause a said feeding movement of the grinding wheel after the work piece has been positioned axially relative to the grinding wheel.

8. In a grinding machine, as claimed in claim 5, in combination with the parts and features therein specified of a control valve simultaneously to admit fluid under pressure to the pot chuck cylinders and to the wheel feed cylinder, and a limit switch actuated by movement of the steady rest frame to an operative position to actuate said control valve so as to actuate the clamping jaws and to cause a feeding movement of the grinding wheel only after the work piece has been positioned axially relative to the grinding wheel.

References Cited in the file of this patent

UNITED STATES PATENTS

| Number | Name | Date |
|---|---|---|
| 1,564,670 | Hansen | Dec. 8, 1925 |
| 2,264,160 | Flygare et al. | Nov. 25, 1941 |
| 2,419,170 | Silven | Apr. 15, 1947 |
| 2,559,431 | Hollengreen et al. | July 3, 1951 |